MECHANISM FOR CLEANING COKE-OVEN DOOR FRAMES AND SHELLS

Filed April 18, 1961 11 Sheets-Sheet 1

INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN

BY Glascock Downing & Seebold
ATTORNEYS

MECHANISM FOR CLEANING COKE-OVEN DOOR FRAMES AND SHELLS

INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN

BY Glascock Downing & Seebold
ATTORNEYS

MECHANISM FOR CLEANING COKE-OVEN DOOR FRAMES AND SHELLS

Filed April 18, 1961 11 Sheets-Sheet 3

INVENTORS:
N.V. BALITSKY
S.I. VOLODIN
R.P. ZMIJEVSKY
D.P. SAVCHENKO
G.A. SELEZNIOVA
I.L. NEPOMNIASHTSHY
V.T. TAPESHKIN

BY Glascock Downing & Seebold
ATTORNEYS

MECHANISM FOR CLEANING COKE-OVEN DOOR FRAMES AND SHELLS

Filed April 18, 1961 11 Sheets-Sheet 4

INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN

BY Glascock Downing & Seebold
ATTORNEYS

MECHANISM FOR CLEANING COKE-OVEN DOOR FRAMES AND SHELLS

Filed April 18, 1961 11 Sheets-Sheet 5

INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN

BY Glascock Downing & Seebold
ATTORNEYS

MECHANISM FOR CLEANING COKE-OVEN DOOR FRAMES AND SHELLS

Filed April 18, 1961

INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN

BY Glascock Downing & Seebold
ATTORNEYS

MECHANISM FOR CLEANING COKE-OVEN DOOR FRAMES AND SHELLS

Filed April 18, 1961 11 Sheets-Sheet 7

INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN

BY Glascock Downing & Seebold
ATTORNEYS

INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN
BY Glascock Downing & Seebold
ATTORNEYS INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN
BY Glascock Downing & Seebold
ATTORNEYS INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN BY Glascock Downing Seebold
ATTORNEYS INVENTORS:
N. V. BALITSKY
S. I. VOLODIN
R. P. ZMIJEVSKY
D. P. SAVCHENKO
G. A. SELEZNIOVA
I. L. NEPOMNIASHTSHY
V. T. TAPESHKIN
BY Glascock Downing & Seebold
ATTORNEYS United States Patent Office 3,146,475
Patented Sept. 1, 1964

3,146,475

MECHANISM FOR CLEANING COKE-OVEN DOOR FRAMES AND SHELLS

Nicolay Vasiljevich Balitsky, Serguey Ivanovich Volodin, Rostislav Petrovich Zmijevsky, Dmitry Pavlovich Savchenko, and Galina Anisimovna Selezniova, Slaviansk, Igor Lazarevich Nepomniashtshy, Stalino, and Vasily Tikhonovich Tapeshkin, Slaviansk, U.S.S.R., assignors to Konstruktorskoje Bureau Koksohimmash Giprokoksa Filed Apr. 18, 1961, Ser. No. 127,758
9 Claims. (Cl. 15—21)

The present invention relates to a mechanism for cleaning coke oven door frames and shells.

The present invention relates to mechanisms designed to remove graphite and tar deposits from coke oven door frames and shells over the entire perimeter of face surface and side surfaces of coke oven door frame and shell, as well as its sill and top.

Known mechanisms for cleaning coke oven door frames and shells have a number of shortcominings. Some of these mechanisms accomplish the cleaning of the door frames and shells only on the vertical sections, but cannot clean the sills and tops. Other mechanisms have rigidly fixed brushes and scrapers. Still others of a third construction do not have brushes for entering the door frame and thus cannot ensure thorough cleaning, especially when the door frames or shells are, though very slightly, misaligned or uneven.

All these shortcomings are eliminated by the construction of the present cleaning mechanism, this being achieved by attaching the brush scrapers to the carriages by means of spring mountings, the carriages having reciprocating motion in a self-aligning guide assembly which brings the entire mechanism into alignment with the actual position of the oven door frame and shell and provides automatic retraction from the surface being cleaned.

To screen the mechanism from the effect of the high temperature within the oven, the cleaning mechanism is provided at its front part with a shield plate incorporating guide locators.

Such design of the cleaning mechanism ensures thorough cleaning of the coke oven door frames and shells over their entire perimeter and makes possible the servicing of ovens in which the misalignment of the door frames or shells is quite considerable but does not result in deviations of the guide assembly greater than 100 mm. either way from its initial position.

Other distinctive features and advantages of the invention can be seen from the description given below and the drawings attached thereto.

The coke oven door frame and shell cleaning mechanism M is mounted on an independent trolley and arranged between the door removing machine and guide.

Figure 1:
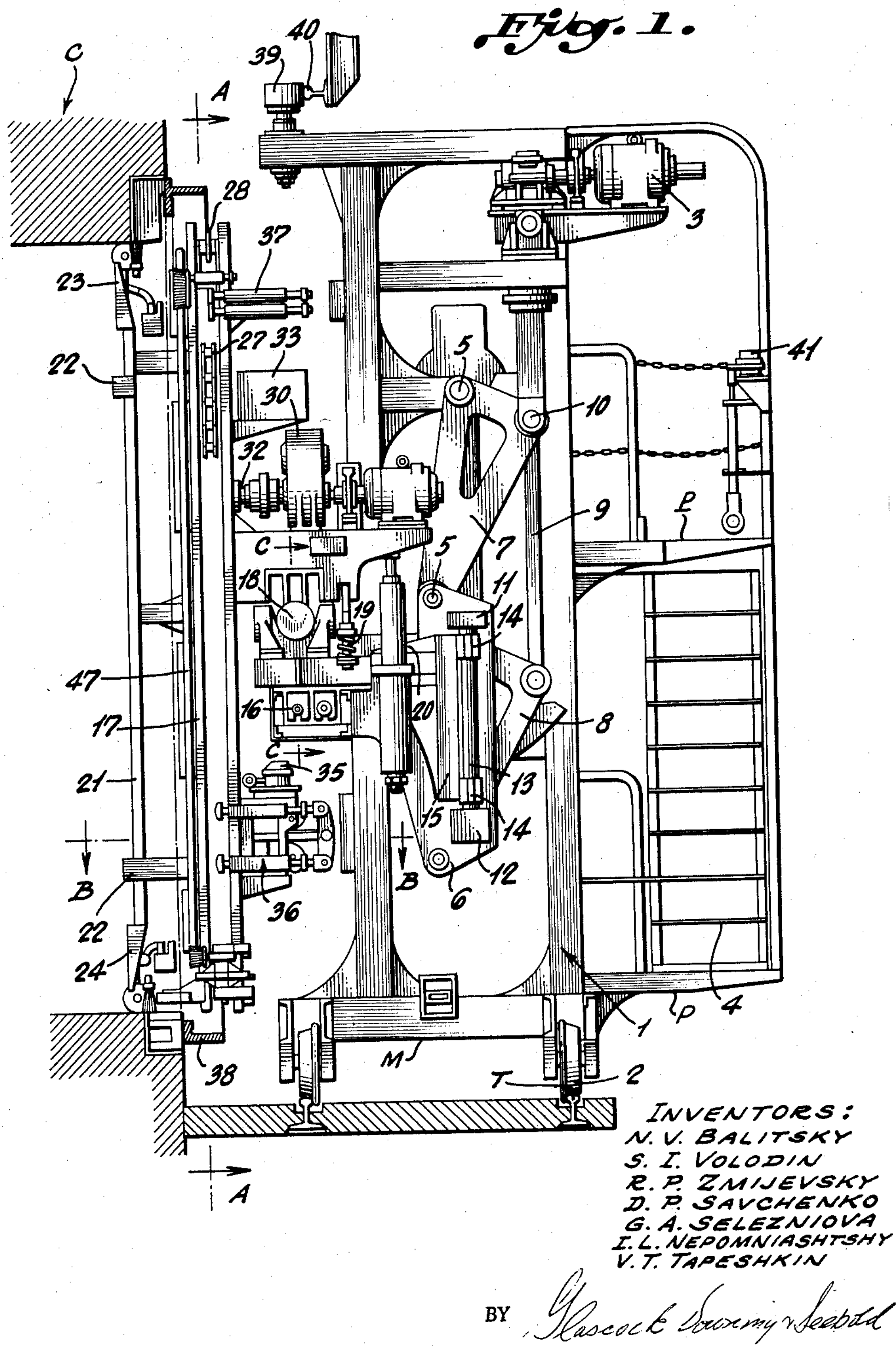
FIG. 1 is a side elevation of the mechanism for cleaning oven door frames and shells.
Figure 2:
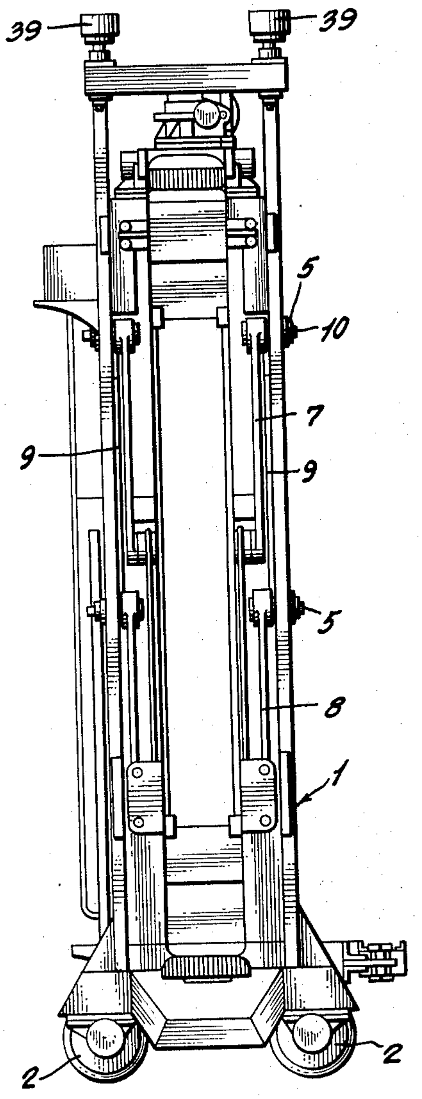
FIG. 2 is a front elevation.
Figure 3:
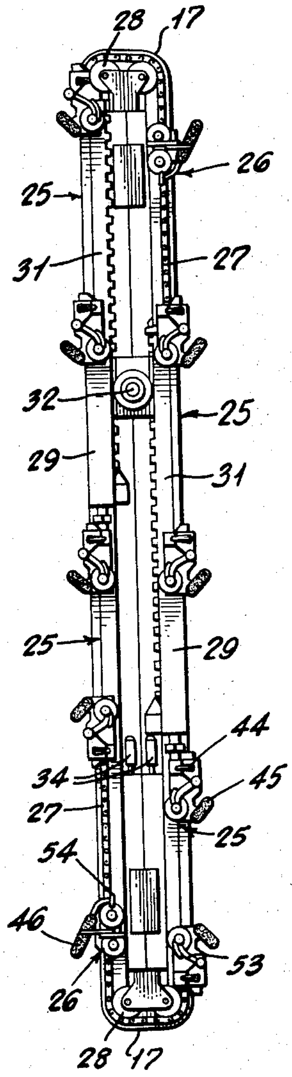
FIG. 3 is a view taken along A—A of FIG. 1.
Figure 4:
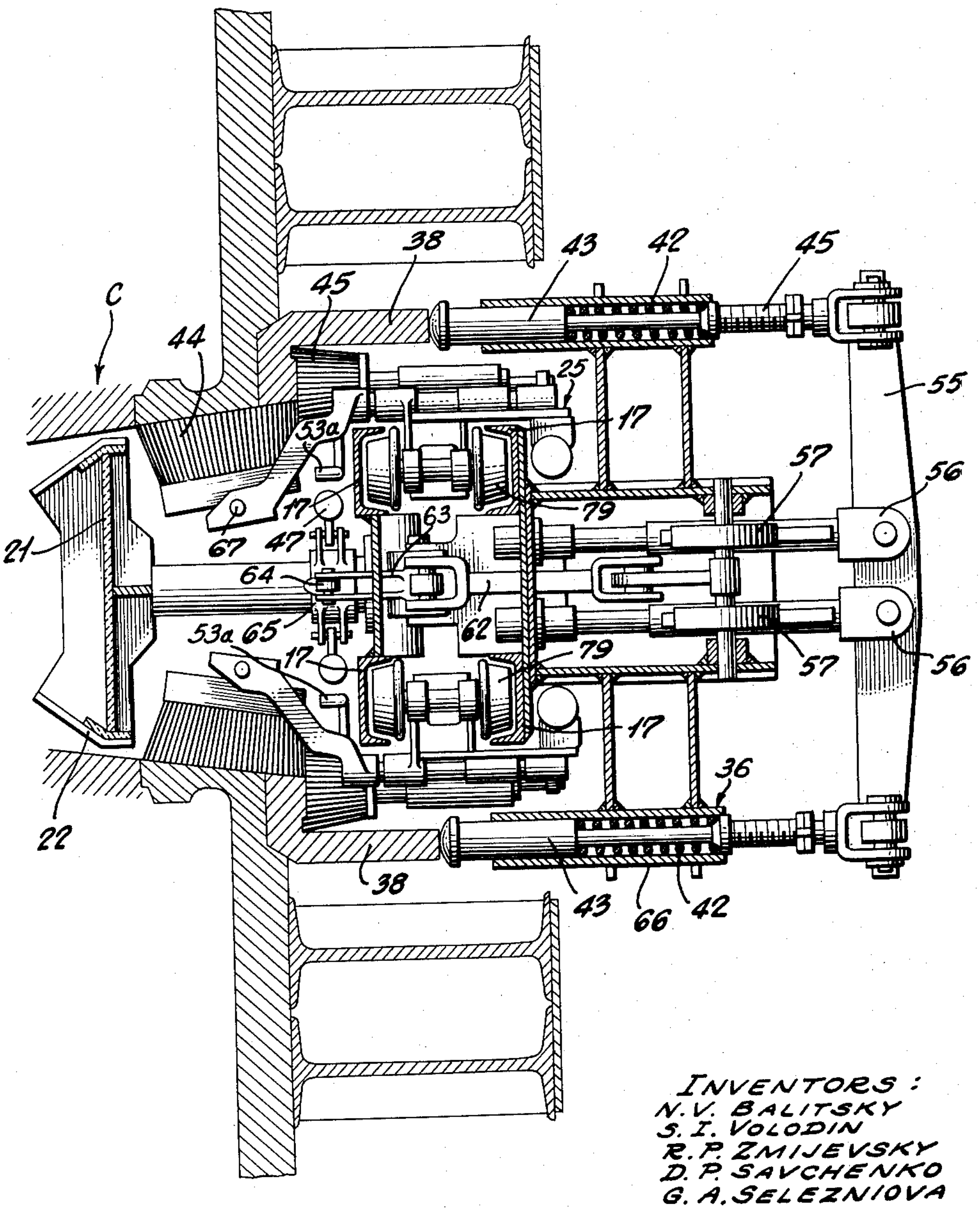
FIG. 4 is a view taken along B—B of FIG. 1.
Figure 5:
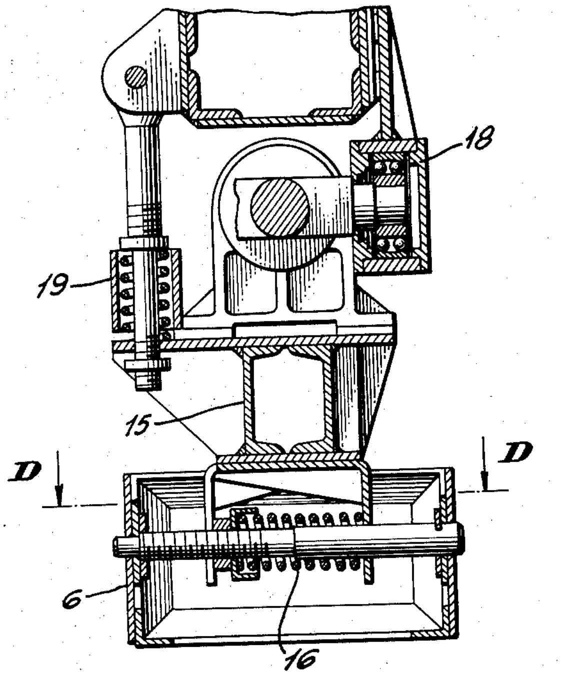
FIG. 5 is a view taken along C—C of FIG. 1.
Figure 16:
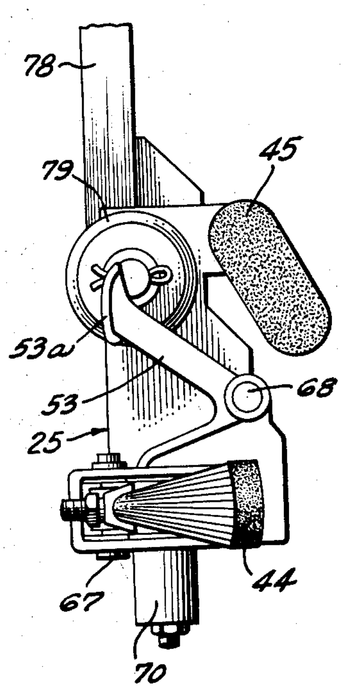
FIG. 16 is a view of FIG. 14 in the direction of arrow A.
Figure 6:
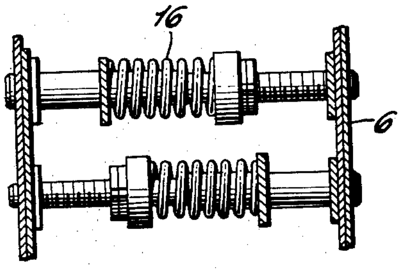
FIG. 6 is a view taken along D—D of FIG. 5.
Figure 7:
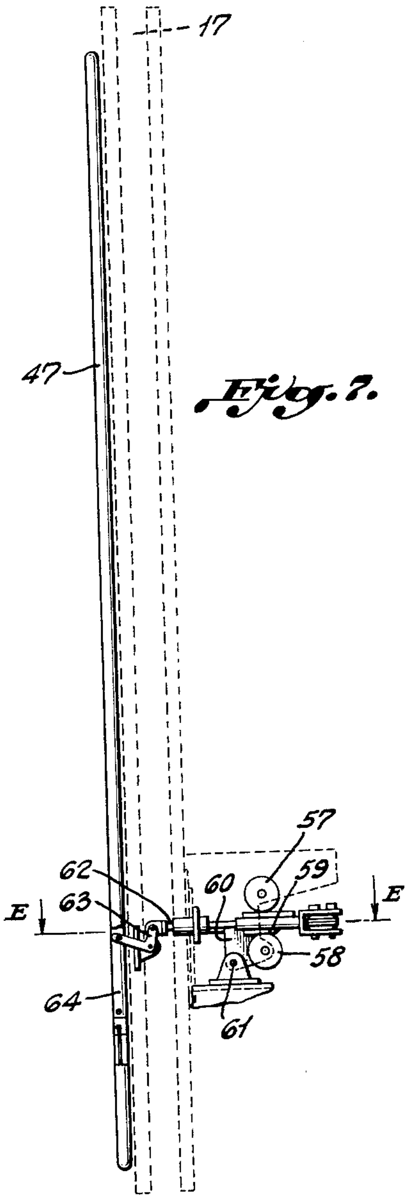
FIG. 7 is a view in side elevation of the guide rods.
Figure 8:
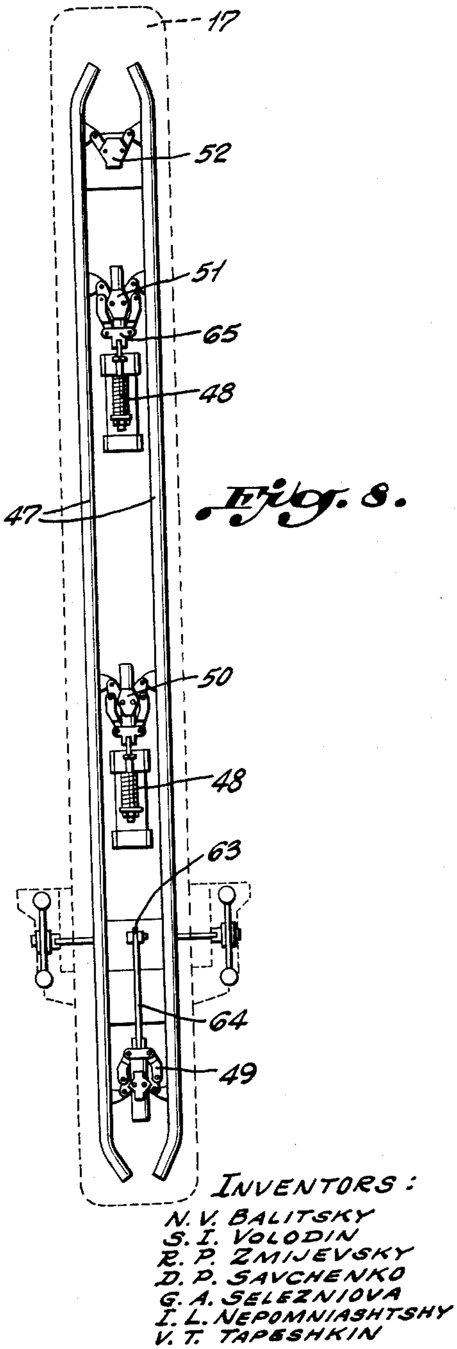
FIG. 8 is a view in front elevation of the guide rods.
Figure 9:
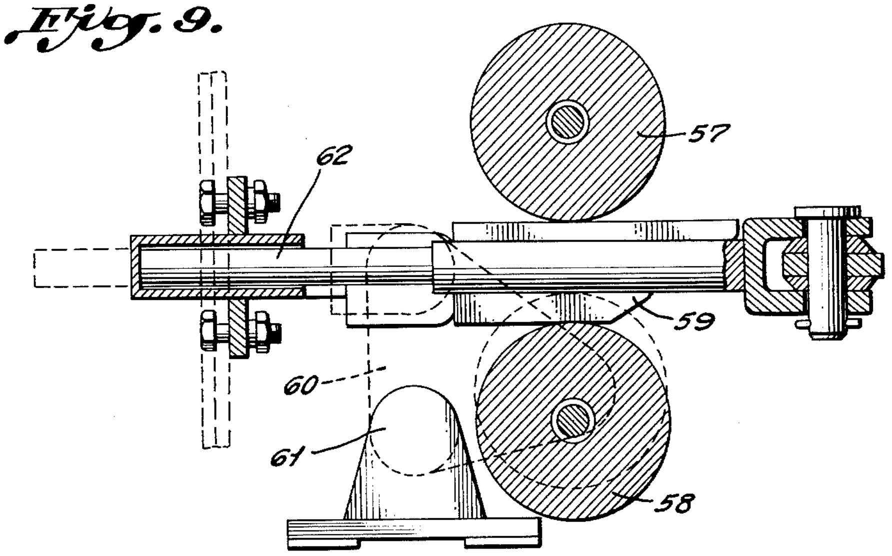
FIG. 9 is a view in side elevation, partly in cross-section of the component shown in FIG. 7, the view being on an enlarged scale.

As shown in FIG. 1, a cleaning mechanism trolley or carriage 1 provided with track wheels 2 is adapted to run along tracks T paralleling oven O. Lower platform P of the carriage is located at about the same level as the working platforms of the door-removing machine and coke guide. Upper platform *p* serves for access to the cradle removing lifting machine, and a swinging ladder 4 leads to the upper platform.

Journals 5 of a lever suspension unit which carries cradle 6 are connected to the trolley 1. The two upper suspension levers 7 and two lower suspension levers 8 are joined together by two vertical tie rods 9, and with the aid of upper transverse shaft 10 are also joined to the connecting rod of cradle removing lifting-mechanism worm screw reduction gear 3.

The lever suspension unit serves to bring the door frame and shell cleaning mechanism M into position at the oven to be serviced and to withdraw the mechanism into its extreme rear position.

Vertical axle 13, to which by means of two-part clamps 14, swinging bracket 15 is fastened, is held in bearings 11 and 12. Turning of the bracket 15 is counter balanced and limited by two horizontal springs 16.

A cleaning mechanism self-aligning guide 17 is mounted on swinging bracket 15 by means of spider 18 and counterbalanced by two vertical side springs 19 and two rear springs 20.

A removable protective shield plate 21 provided with four door frame locators 22 and transverse upper and lower brushes 23 and 24, respectively is secured at the front of guide 17. The protective shield serves to protect the mechanism against the escaping hot gases and flames, and also functions to set guide 17 and the associated cleaning gear in the necessary working position relative to the oven door frame to be serviced.

The transverse upper and lower brushes 23 and 24 clean the top and sill of the door frame of graphite and tar deposits, and also remove the debris due to cleaning from the door frame sill on withdrawal of the cleaning mechanism from the oven.

The working parts of the cleaning mechanism comprise four double side brush carriages 25 and two face brush carriages 26 with such carriages having reciprocating motion on rollers in self-aligning guide 17. These carriages carry spring mounted metal wires brushes as will later be described.

Carriages 25 and 26 are interconnected by a bushing roller type chain 27 which runs over four idlers 28 and two spring compensators 29.

The reciprocating motion of carriages 25 and 26 is accomplished by electric drive 30 and a chain transmission comprising two chain racks 31 and one sprocket fastened on low speed shaft 32 of the drive.

Reversal of the drive is accomplished by a travel master switch 33, while the limiting of carriage travel is performed by two spring bumpers 34 and limit switches 35, one of which is shown in FIG. 1.

When cleaning a coke oven door frame and shell, the guide 17 is supported by its bumpers 36 and 37 which rest on door frame flange 38 to steady the position of the trolley 1. The latter, by means of its rollers 39, rests on rail 40 of the door removing machine.

The mechanism provides for electric interlocking of the cleaning mechanism with the door removing machine, as well as interlocking of a manual drive 41 of the cradle removing lifting mechanism. Bumper shafts 43 are held in the extreme advanced position by springs 42.

Brushes 44 and 45 are fastened to the carriage 25 and brush 46 to the carriage 26. The brush expanding arrangement comprises two vertical rods 47, springs 48, lever assemblies 49, 50, 51 and 52 together with carriage double-arm levers 60 and 63, a rocker arm 55 pinned to the bumper rods 43, switch-rods 56, fixed upper rollers 57 and adjustable rollers 58.

The adjustable rollers travel along a cam bar 59 and are connected with double-arm lever 60, which can turn about axis 61. Double-arm lever 60 is connected to rod 62, a second double-arm lever 63, shackle 64 and levers 65.

Brushes 44 which are fastened on double arm lever 53 can turn freely about axis 67 and lever 53 turns on axis 68.

Spring 69 enclosed in a casing 70 serves to bring brushes 44 into their working position and turning of the above mentioned double arm lever 53 is effected via rod 71 and crank 72.

The face brushes 45 travel in the axial direction under the action of springs 73 enclosed in a casing 74. The bodies of brushes 45 are fastened on levers 75 and 76 and interconnected by a tie rod 77 with the rod 71 and the spring 69.

The chain rack 31 is suitably fastened to a carriage body 78.

The carriages are provided with rollers 79 which bear carrier bodies 78 and 80. Double-arm lever 54 carries the face brush 46 and a scraper 81 which can travel in the axial direction under the aciton of spring 82 and turn together with double-arm lever 54 about axis 83 under the action of spring 84.

Figure 18:
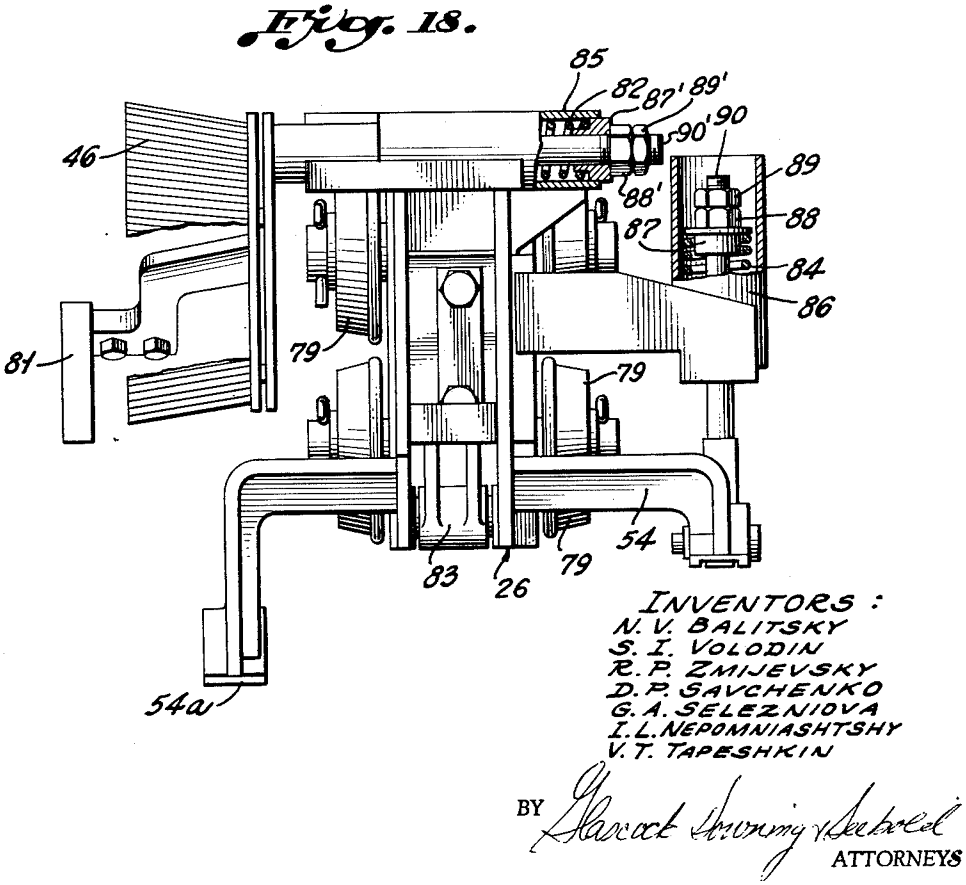
FIG. 18 is a view in side elevation of the face brush mounting arrangement.
Figure 10:
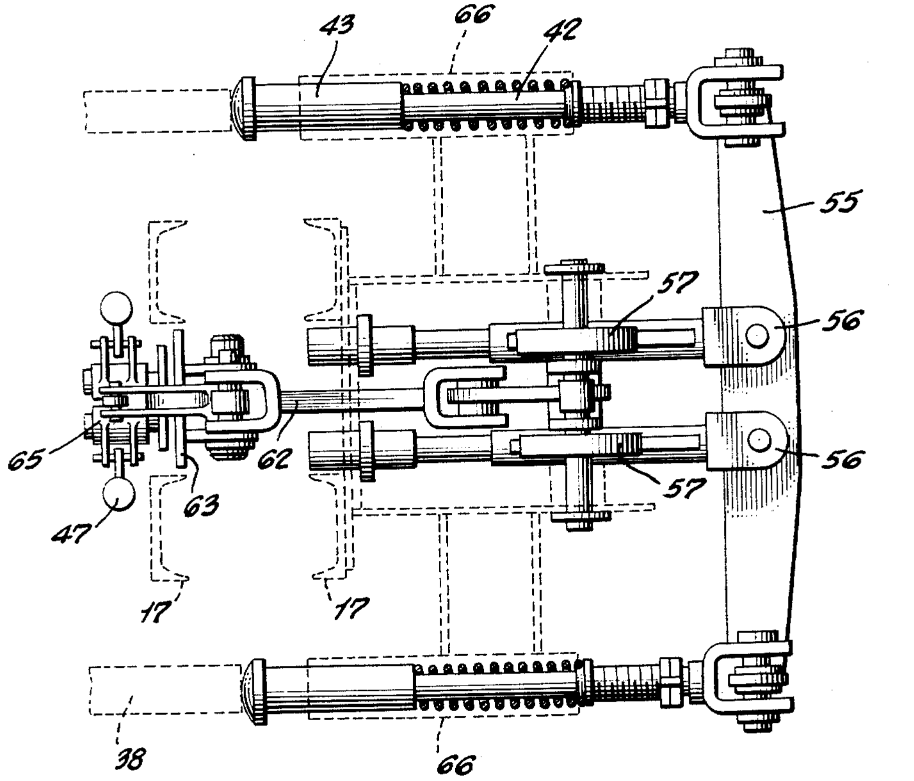
FIG. 10 is a view taken along line E—E of FIG. 7.
Figures 11, 12, 13:
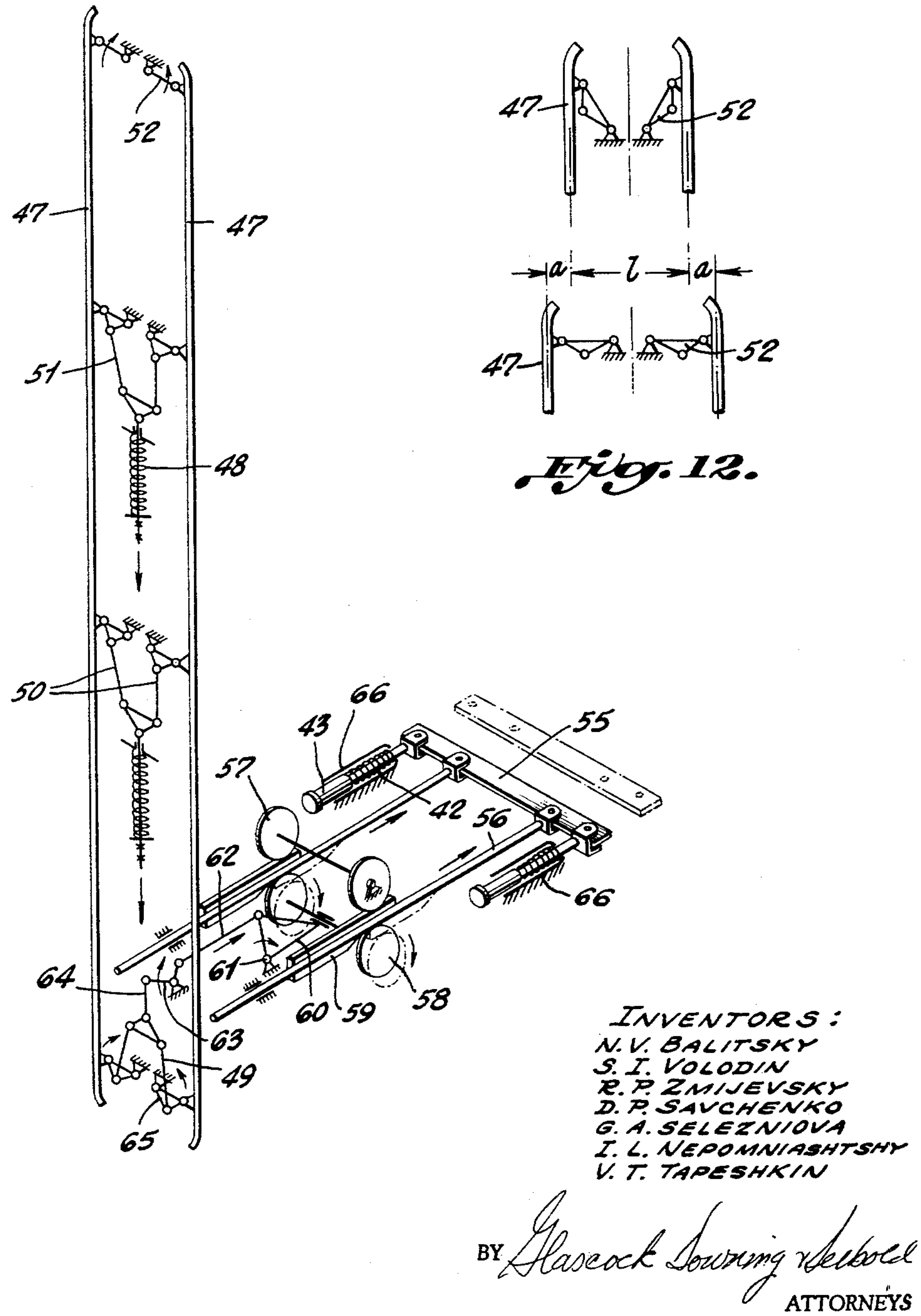
FIG. 11 is a kinematic, diagrammatic view of the cleaning mechanism.
FIG. 12 is a view illustrating the lever system in its initial position (guide rods expanded).
FIG. 13 is a view illustrating the lever system in a working position (guide rods brought together)
Figure 14:
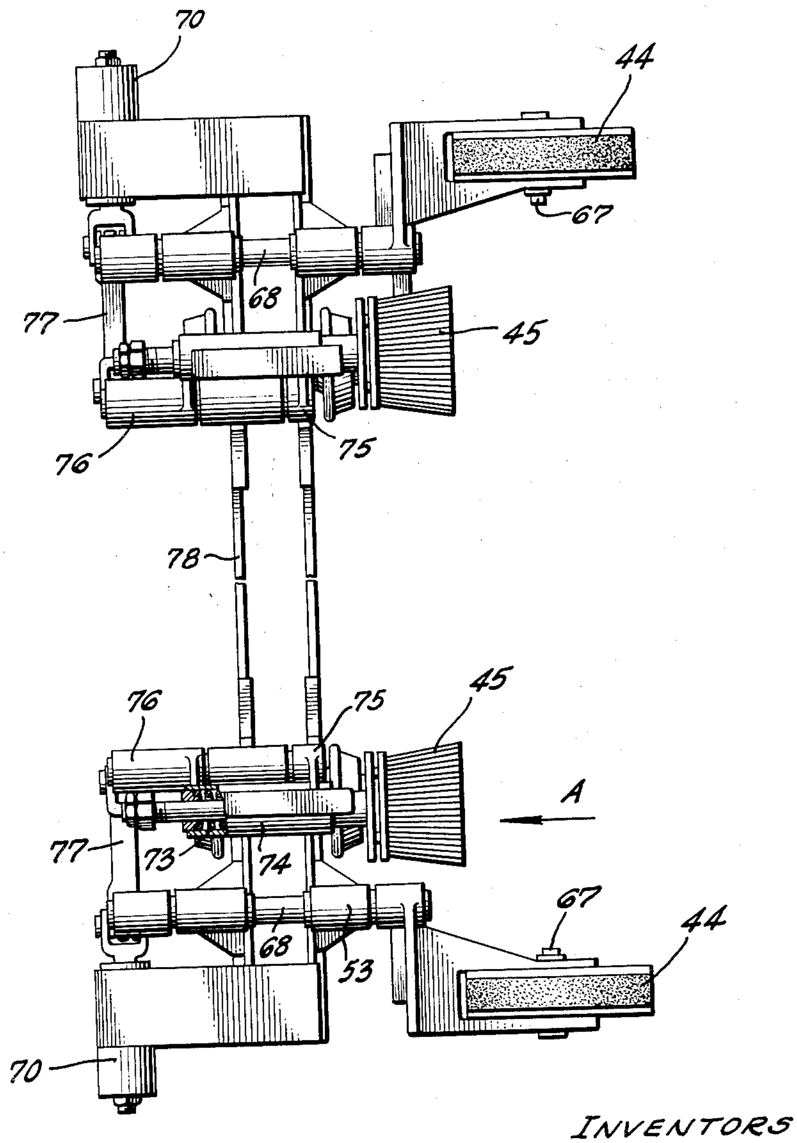
FIG. 14 is a side view of the brush carriage.
Figure 17:
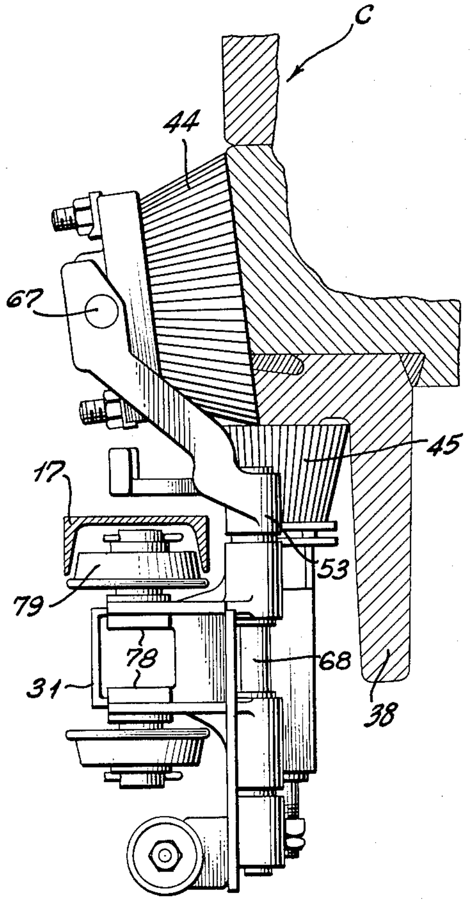
FIG. 17 is a view of the brushes in a working position.
Figure 15:
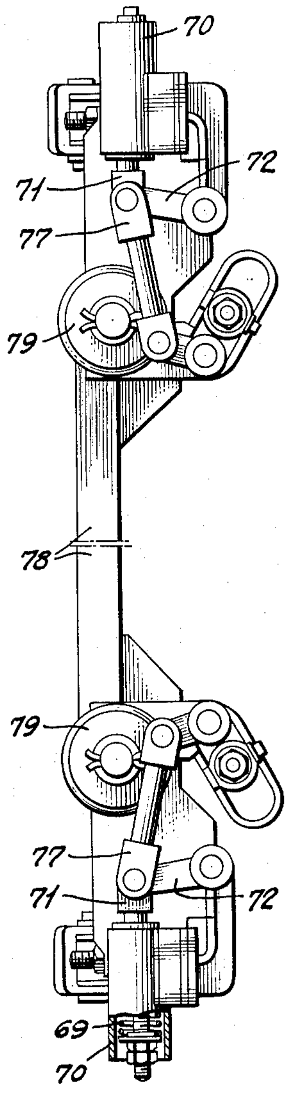
FIG. 15 is a front view of the brush carriage.
Figures 19, 20:
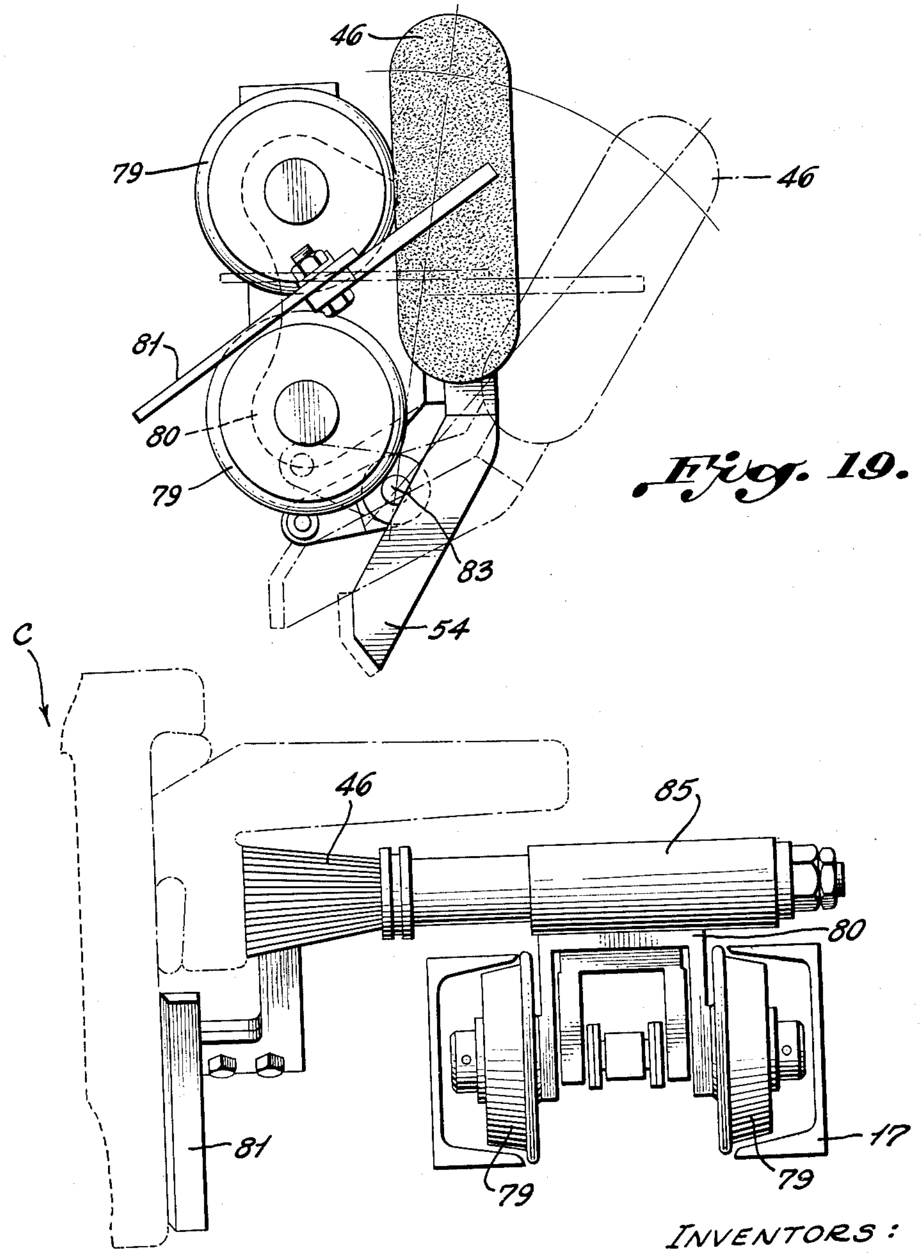
FIG. 19 is a view in front elevation of the face brush mounting arrangement.
FIG. 20 is a top plan view of the face brush mounting arrangement.

As shown in FIG. 18, spring 84 is received in a casing 86 and surrounds rod 90. A washer 87 is received on the rod 90 and engages the free end of spring 84. Washer 87 is held in adjusted position by a nut threadedly received on rod 90, and nut 88 is locked by a lock nut 89. In a similar manner spring 82 is received in a casing 85 and surrounds rod 90′. A washer 87′ is received on the rod 90′, and engages the free end of spring 82. Washer 87′ is held in adjusted position by a nut 88′ threadedly received on rod 90′ and nut 88′ is locked by a lock nut 89′.

The cleaning mechanism has two modes of operation, namely setting-up and automatic. Control of the cleaning mechanism is accomplished from the operator's cab of the door removing machine.

When the cleaning mechanism is in its extreme rear position (for transportation), guide 17 and all the movable units are held in a suspended position by worm screw reduction gear 3 of the removing lifting mechanism. In this position, guide 17 is counter-balanced by the six springs 16, 19 and 20. During transportation, the cleaning mechanism is steadied by idlers fitted on the lower corner levers 8 to prevent sidewise swinging.

Bumper rods 43, are kept, by the force of springs 42, in the extreme advanced position. In this position, lower spring bumpers 36, which are connected to the brush expanding spring lever system, force the brushes 44, 45, 46 into their initial non-operative position in which the brushes are withdrawn behind the protective shield 21.

In the above initial position, vertical rods 47 of the brush expanding gear are moved apart (moved away from the vertical axis of guide 17) by the force of lower bumper springs 42 and their own springs 48 and press against tail pieces 53a and 54a of the double-arm levers 53 and 54 of the carriages bearing brushes 44, 45 and 46 to hold the same in the initial non-operative position. When the above takes place, the brush expanding gear lever units are so located that the entire lever system and the brushes supported by the vertical rods 47 self interlock.

When the guide approaches the oven door frame, the shell frame locators 22 associated with the protective shield 21 are the first to enter the door frame and shell and turn guide 17 on spider 18 and about vertical axis 13 so that the axes of guide 17 becomes parallel to the vertical axis of the oven and to the surface plane of the door frame. As soon as the protective shield completely enters the oven, spring bumpers 36 press against door frame flanges 38. However, entry of the guide into the oven is not yet completed, and, consequently, the brushes screened by the protective shield 21 do not yet contact the door frame surface to be cleaned. From the above moment, and until the guide 17 is stopped in its extreme forward position, bumper rods 43, rocker arm 55 and switch rods 56, while remaining motionless in relation to the oven door frame, perform switching of the brush expanding gear lever units 49, 50, 51 and 52, and of the vertical rods 47 connected thereto.

While the guide assembly, together with the cleaning gear fixed thereto, continues its forward motion (until finally stopped), the upper stationary rollers 57 and adjustable rollers 58 of the brush expanding gear travel along cam bar 59 to turn double-arm lever 68 about its axis 61.

The motion of the lever 60, connected by rod 62 to the other double-arm lever 63, is transmitted by shackle 64 to lower lever assembly 49 of brush expanding gear 21, which is connected to the vertical rods 47 and lever assemblies 50, 51 and 52.

When the levers 65 turn, the rods 47 are drawn together, release tail pieces 53a and 54a of brush carriage double-arm levers 53 and 54, and bring the brushes into contact with the door frame surface to be cleaned.

Provision of the cam bar 59 provides for proper timing of the brush expansion and close contact of the brushes with the oven door frame side surface and the face surface requiring cleaning with but very small forward travel (about 50 mms.) of guide 17 and the cleaning gear and also before advance of the latter is complete. In this position, springs 42 are compressed and the entire brush expanding spring lever-system is held "locked in" by the lower bumpers 36.

At the moment guide 17 and the cleaning gear comes to rest in the preset extreme position, the cleaning gear drive is automatically switched in, and the brushes, in performing their reciprocating motion, carry out cleaning of the door frame and shell. The cleaning mechanism is set up to perform 10 to 15 double strokes of the carriage (sufficient to ensure high quality cleaning of the door frame and shell and after which the guide and cleaning gear associated therewith are automatically withdrawn from the oven into their extreme rear position).

When the guide 17 and the cleaning gear thereon is being withdrawn, springs 42 of lower bumpers 36 force the shafts 43 out of the bumper body 66 and hold the same against the oven door frame. As this takes place, rollers 57 and 58 travel off the cam bar 59 to release the brush expanding lever system. Under the action of springs 48 levers 65 of lever units 50 and 51 turn to spread the vertical rods 47 apart and away from the vertical axis of the mechanism. In doing so, the rods 47 press upon tail pieces 53a and 54a of carriage double-arm levers 53 and 54 in order to retract the brushes to their initial position, i.e. to perform a withdrawal operation of the brushes from the door frame surface being cleaned towards the longitudinal axis of the mechanism.

The four double carriages 25 support spring mounted self-aligning metal wire brushes, namely, two door frame side surface cleaning brushes 44 and two door frame face surface cleaning brushes 45.

Door frame side cleaning brushes 44 are pivotally mounted on the double-arm lever 53 and can turn freely on the axis 67. Rods 47, in pressing against the tail-piece 53*a* turn double-arm lever 53 about the axis 68, thus retracting the brushes from the door frame surface being cleaned towards the longitudinal axis of the mechanism.

The brush 45 is set into the working position by the spring 69 enclosed in casing 70. Turning of the double-arm lever is carried out by the connecting rod 71 and crank 72.

Face cleaning brush 45 can travel in the axial direction under the action of spring 73 which is enclosed in casing 74. The latter is fastened to levers 75 and 76 and interconnected by tie rod 77 to the side-cleaning brush spring 69. Turning of the casing is performed simultaneously with turning of double-arm lever 53 of side cleaning brush 44 about the axis 68. Chain rack 31 of the drive is secured to the even surface of the carriage body 78. In its travels, the carriage is supported by four rollers 79 which run in a raceway or track in guide 17 which track consists of two channel sections. The two face surface cleaning carriages 26 which serve to clean the door frame face plane surface and face parts of the door frame top and sill travel along the rounded parts and the horizontal portions of guide 17.

Carriage body 80 is supported by four rollers 79. Carriage double-arm lever 54 carries face surface cleaning brush 46 and scraper 81. The brushes and the scraper can travel in the axial direction under the action of spring 82 and also turn about axis 83 together with double-arm lever 54 under the action of spring 84. The degree of turning of the double-arm lever in the working position is limited by the internal rib of the oven door frame which serves as the equivalent of a cam bar with which the brush is continuously in touch to limit its turning.

The tail piece 54*a* of double-arm lever 54 when vertical rods 47 are being expanded, causes retraction of face surface cleaning brush 46 back to its initial (non-operative) position.

What we claim is:

1. In an apparatus for cleaning the surfaces of door frames of coke ovens, the combination of a trolley adapted to move parallel to the front of the oven, guide means having a configuration substantially conforming to that of the door and including means defining a continuous track having side portions and upper and lower portions, a plurality of wheeled carriages arranged on the track for travel relative to the side portions and upper and lower portions, each carriage being provided with a face metal wire brush, and a side metal wire brush, power transmission means connecting the carriages, drive means operably coupled to the power transmission means for imparting reciprocatory movement to the carriages, means swingably mounting the guide means on the trolley for movement toward and away from the oven allowing the guide means to deviate from a vertical position in a plane parallel to the oven front and in a plane normal to the oven front, said swingably mounting means including means permitting the guide means to rotate about a vertical axis so that the guide means may be properly aligned with the oven door frame, a heat protective shield attached to and extending forwardly of said guide means, and locators on said shield operative on movement of the guide means toward the oven to enter the oven thereby rotating the guide means to a position parallel to the oven frame thus ensuring a free inlet of the guide means, carriages and brushes into the frame.

2. In an apparatus for cleaning the surface of door frames of coke ovens, the combination of a trolley adapted to move parallel to the front of the oven, guide means, means on the guide means defining a continuous track having side portions and upper and lower portions, a plurality of wheeled carriages arranged on the track for travel relative to the side portions and upper and lower portions, each carriage being provided with a face metal wire brush, and a side metal wire brush, power transmission means connecting the carriages, drive means operably coupled to the power transmission for imparting reciprocatory movement to the carriages, means swingably mounting the guide means on the trolley for movement toward and away from the oven allowing the guide means to deviate from a vertical position in a plane parallel to the oven front and in a plane normal to the oven front, said swingably mounting means including means permitting the guide means to rotate about a vertical axis so that the guide means may be properly aligned with the oven door frame, a heat protective shield attached to and extending forwardly of the guide means, locators on said shield operative on movement of the guide means toward the oven to enter the oven thereby rotating the guide means to a position parallel to the oven frame thus ensuring a free inlet of the guide means, carriages and brushes into the frame, and upper and lower horizontal bumper means on said guide means operative when the guide means is moved toward the oven to bear against portions of the frame to urge the guide means to assume a stable position parallel to the frame in a plane normal to the oven front.

3. In the combination as claimed in claim 1, further including upper and lower lateral brushes mounted on said heat protective shield for cleaning the inner horizontal surfaces of the frame.

4. In the combination as claimed in claim 1, further including spring-compensating means operably connecting the carriages movable along the side portions imparting continuous pull to the power transmission means thus preventing sagging of the power transmission means during movement of the guide means away from the oven.

5. In the combination as claimed in claim 1, wherein said drive means comprises an electric motor, rack means on the power transmission means along each of the side portions, and gear means meshing with each of said rack means and operably coupled with the electric motor for assuring a uniform distribution of stresses along the power transmission means.

6. In the combination as claimed in claim 1, wherein said carriages include four double unit carriages for the side portions and two carriages for each of the upper and lower portions.

7. An apparatus for cleaning the surfaces of door frames of coke ovens, comprising a trolley adapted to move parallel to the front of the oven, guide means, means on the guide means defining a continuous track having side portions and upper and lower portions, a plurality of wheeled carriages arranged on the track for travel relative to the side portions and upper and lower portions, each carriage being provided with a face metal wire brush, and a side metal wire brush, power transmission means connecting the carriages, drive means operably coupled to the power transmission for imparting reciprocatory movement to the carriages, means swingably mounting the guide means on the trolley for movement toward and away from the oven allowing the guide means to deviate from a vertical position in a plane parallel to the oven front and in a plane normal to the oven front, said swingably mounting means including means permitting the guide means to rotate about a vertical axis so that the guide means may be properly aligned with the oven door frame, a heat protective shield attached to and extending forwardly of the guide means, locators on said shield operative on movement of the guide means toward the oven to enter the oven thereby rotating the guide means to a position parallel to the oven frame thus ensuring a free inlet of the guide means, carriages and brushes into the frame, upper and lower horizontal bumper means on said guide means operative when the guide means is moved toward the oven to bear against portions of the frame to urge the guide means to assume a stable position parallel to the frame in a plane normal to the oven front, means pivotally mounting said brushes on the carriages for movement from an inoperative position rearwardly of the heat protective shield to an operative position respecting the frame, means operably connected to the brushes to maintain the same in the inoperative position, and means operatively connected with said brush mounting means for moving said brushes to the operative position when the guide means enters the oven.

8. The cleaning apparatus as claimed in claim 7, in which the means maintaining the brushes in the inoperative position include said lower horizontal bumper means.

9. The cleaning apparatus as claimed in claim 8, in which the means moving said brushes to the operative position include said lower horizontal bumper means and a resilient-lever arrangement operably associated with such bumper means and the pivotally mounting means.

References Cited in the file of this patent

FOREIGN PATENTS

| | | |
|---|---|---|
| 741,071 | Great Britain | Nov. 23, 1955 |
| 856,095 | Great Britain | Dec. 14, 1960 |